United States Patent
Yasuda et al.

(10) Patent No.: US 11,644,076 B2
(45) Date of Patent: May 9, 2023

(54) SINTERED METAL FRICTION MATERIAL

(71) Applicant: TOKAI CARBON CO., LTD., Tokyo (JP)

(72) Inventors: Makoto Yasuda, Tokyo (JP); Takuya Kinomura, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 758 days.

(21) Appl. No.: 16/476,652

(22) PCT Filed: Nov. 16, 2017

(86) PCT No.: PCT/JP2017/041220
§ 371 (c)(1),
(2) Date: Jul. 9, 2019

(87) PCT Pub. No.: WO2018/131287
PCT Pub. Date: Jul. 19, 2018

(65) Prior Publication Data
US 2021/0041002 A1    Feb. 11, 2021

(30) Foreign Application Priority Data

Jan. 10, 2017  (JP) .............................. JP2017-001898

(51) Int. Cl.
| | | |
|---|---|---|
| *F16D 69/02* | (2006.01) |
| *B22F 7/04* | (2006.01) |
| *B22F 9/08* | (2006.01) |
| *B22F 9/30* | (2006.01) |
| *C22C 1/05* | (2023.01) |
| *C22C 38/00* | (2006.01) |
| *C22C 38/08* | (2006.01) |
| *C22C 38/16* | (2006.01) |

(52) U.S. Cl.
CPC .............. *F16D 69/027* (2013.01); *B22F 7/04* (2013.01); *B22F 9/082* (2013.01); *B22F 9/30* (2013.01); *C22C 1/05* (2013.01); *C22C 38/002* (2013.01); *C22C 38/008* (2013.01); *C22C 38/08* (2013.01); *C22C 38/16* (2013.01); *B22F 2301/35* (2013.01); *F16D 2200/0008* (2013.01); *F16D 2200/0086* (2013.01)

(58) Field of Classification Search
CPC ................................. F16D 69/027; B22F 7/04
USPC ........................................................ 51/309
See application file for complete search history.

(56) References Cited

U.S. PATENT DOCUMENTS 5,689,796 A * 11/1997 Kasai ..................... C22C 1/045
                                                     419/36

FOREIGN PATENT DOCUMENTS

| JP | 63-30617 A | 2/1988 |
|---|---|---|
| JP | 4-15285 A | 1/1992 |
| JP | 5-86359 A | 4/1993 |
| JP | 5-179232 A | 7/1993 |
| JP | 2000-345140 A | 12/2000 |
| JP | 2000-345141 A | 12/2000 |
| JP | 2006-16680 A | 1/2006 |
| JP | 2006016680 A * | 1/2006 |
| JP | 4430468 B2 | 3/2010 |

OTHER PUBLICATIONS

International Search Report dated Jan. 9, 2018, issued in counterpart International Application No. PCT/JP2017/041220 (2 pages).

* cited by examiner

*Primary Examiner* — Weiping Zhu
(74) *Attorney, Agent, or Firm* — WHDA, LLP

(57) ABSTRACT

The present invention provides a sintered metal friction material that has excellent wear resistance, heat resistance even at high load and has a higher friction coefficient while maintaining a friction coefficient and wear resistance that are hard to decrease, and has a reduced content of copper of less than 5 mass %. There is provided a sintered metal friction material characterized in that the sintered metal friction material comprises a sintered material of a friction material composition, the friction material composition comprises matrix metals and a friction modifier, the matrix metals comprise following 20 to 40 mass % of iron powder, 20 to 40 mass % of nickel powder, 0.5 to 10 mass % of zinc powder, 0.5 to 5 mass, of tin powder, 0.5 to 4 mass % of copper powder and 0.5 to 5 mass % of sintering assist powder.

4 Claims, 1 Drawing Sheet

SINTERED METAL FRICTION MATERIAL

TECHNICAL FIELD

The present invention relates to a sintered metal friction material, particularly to a sintered metal friction material used for a clutch, a disk brake, etc.

BACKGROUND ART

In motorcycles, automobiles, railroad vehicles, aircrafts etc. and industrial machines etc., the power transmission between an engine and a transmission is achieved by a contact between an annular clutch plate of the engine side and an annular clutch plate of the transmission side with each other that both constitute a clutch, and the braking is achieved by a contact between a brake facing constituting a brake and a counterpart plate rotating coaxially in cooperation with a wheel. By providing an annular friction material as a lining on a surface of such a clutch plate (a clutch facing) and on a brake facing, a clutch facing material, a brake lining material and a brake pad material etc. are formed.

The above-mentioned friction material is generally classified into an organic friction material in which a filler component is bound by a binder such as a resin and a rubber, and a metal-based friction material in which a metal or an alloy is sintered as a matrix. Since a metal-based friction material has excellent wear resistance and heat resistance etc. compared to an organic friction material, a metal-based friction material is useful when used under a severe condition.

The output(The load) of vehicles has increasingly become higher due to the recent increase in speed and in size of vehicles, and further, the load applied on various friction materials such as brakes has become more severe. Therefore, a friction material has been required to have excellent wear resistance, heat resistance and a higher friction coefficient, and in addition, required to have a friction coefficient and wear resistance that are hard to decrease even if the material is used repeatedly.

As such a friction material, the applicants have previously proposed in Patent Literature 1 (Japanese Patent No. 4430468) a copper-based sintered friction material that is a sintered body obtained by sintering a matrix metal and a filler component, wherein the matrix metal includes iron powder, nickel powder, stainless steel powder, zinc powder, tin powder and copper powder.

Patent Literature 1
Japanese Patent No. 440468

SUMMARY OF INVENTION

Technical Problem

Although the example in Patent Literature 1 discloses a friction material comprising 30 to 37 mass % of copper powder as a matrix metal, a brake pad has been desired that provides a smaller amount of copper components contained in abrasion powder in terms of environmental protection in recent years. In California, USA, the introduction of the restriction is scheduled in 2021 in which the content of a copper component contained in a brake pad is limited to less than 5 mass %.

In this context, a friction material has been desired that has excellent wear resistance, heat resistance even at high load and has a higher friction coefficient while maintaining a friction coefficient and wear resistance that are hard to decrease and has the content of copper reduced to less than 5 mass %.

On the other hand, according to the investigation by the present inventors, it was found that in order that a sintered metal friction material has excellent wear resistance, heat resistance even at high load and has a higher friction coefficient, and in addition, can provide a suppressed decrease in a friction coefficient and wear resistance even if the material is used repeatedly, the friction material needs to contain a certain amount of copper as a main component, and if a formulation amount of copper is reduced, a decrease in a friction coefficient and a decrease in strength of the friction material as well as an increase in abrasion are caused.

In this circumstance, the object of the present invention is to provide a sintered metal friction material that has excellent wear resistance, heat resistance even at high load and has a higher friction coefficient, and in addition, that can provide a suppressed decrease in a friction coefficient and wear resistance even if the material is used repeatedly, and in addition, that has the content of copper powder reduced to less than 5 mass %.

Solution to Problem

From the above observation, the present inventors further made investigations and found that the above technical problem can be solved on the basis of a sintered metal friction material that comprises a sintered material (sintered product) of a friction material composition comprising matrix metals and a friction modifier, wherein the matrix metals have a particular formulation ratio in which iron powder and nickel powder are contained as main components and the formulation amount of copper powder is reduced, instead of matrix metals containing copper powder as a main component, and have finally completed the present invention based on that observation.

Specifically, the present invention provides:

(1) A sintered metal friction material wherein the sintered metal friction material comprises a sintered material of a friction material composition,
the friction material composition comprises matrix metals and a friction modifier,
the matrix metals comprise following
20 to 40 mass % of iron powder,
20 to 40 mass % of nickel powder,
0.5 to 10 mass % of zinc powder,
0.5 to 5 mass % of tin powder,
0.5 to 4 mass % of copper powder and
0.5 to 5 mass % of sintering assist powder;

(2) the sintered metal friction material according to the above (1), wherein the total content of the matrix metals in the friction material composition is 42 to 95 mass % and the content of the friction modifier in the friction material composition is 5 to 58 mass %;

(3) the sintered metal friction material according to the above (1) or (2), wherein the total content of the iron powder and the nickel powder in the friction material composition is 40 to 80 mass %;

(4) the sintered metal friction material according to any one of the above (1) to (3), wherein the nickel powder is one or more selected from those prepared by the atomizing method and those prepared by the carbonyl nickel method;

(5) the sintered metal friction material according to any one of the above (1) to (4), wherein the sintering assist powder is one or more selected from iron boride powder, iron phosphide powder, copper phosphide powder and phosphor bronze powder; and (6) the sintered metal friction material according to any one of the above (1) to (5), wherein the friction modifier comprises a lubricant material and a hard material, the lubricant material is one or more selected from graphite powder, coke powder, calcium fluoride powder, barium fluoride powder, boron nitride powder and molybdenum disulfide powder, and the hard material is one or more selected from alumina powder, mullite powder, zircon sand powder and silica powder.

Advantageous Effects of Invention

According to the present invention, a sintered metal friction material can be provided that comprises a sintered material of a friction material composition comprising matrix metals and a friction modifier and wherein the matrix metals have a particular formulation ratio in which iron powder and nickel powder are contained as main components, and therefore that has excellent wear resistance, heat resistance even at high load and has a higher friction coefficient while maintaining a friction coefficient and wear resistance that are hard to decrease and has a reduced content of copper of less than 5 mass %.

DESCRIPTION OF EMBODIMENTS

Figure 1:
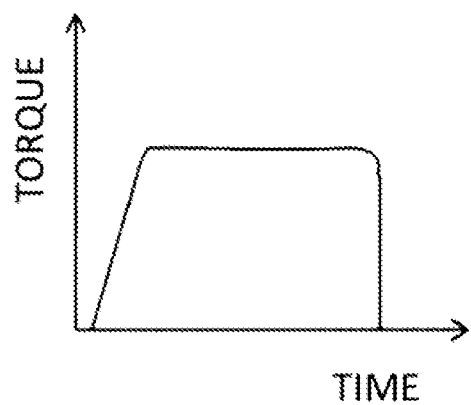
FIG. 1 illustrates a flat torque curve.

The sintered metal friction material of the present invention is characterized in that the sintered metal friction material comprises a sintered material of a friction material composition, the friction material composition comprises matrix metals and a friction modifier, the matrix metals comprise following 20 to 40 mass % of iron powder, 20 to 40 mass % of nickel powder, 0.5 to 10 mass % of zinc powder, 0.5 to 5 mass % of tin powder, 0.5 to 4 mass % of copper powder and 0.5 to 5 mass % of sintering assist powder.

In the sintered metal friction material of the present invention, the iron powder for the matrix metal can be one or more selected from reduced iron powder and cast iron powder etc., and the reduced iron powder is preferable.

When the iron powder constituting matrix metals is reduced iron powder, reduced iron powder has the melting point that is about 300° C. higher than that of cast iron powder, therefore, a sintered metal friction material having excellent friction property at a high temperature can be easily provided.

Examples of the reduced iron powder can include iron powder obtained by a heat treatment of an iron ore in a hydrogen gas or an ammonia gas atmosphere at 600 to 1200° C.

In the sintered metal friction material of the present invention, the iron powder preferably has the range of a particle size within 10 to 500 μm, more preferably 20 to 300 μm, and still more preferably 40 to 150 μm.

The above-mentioned range of a particle size of the iron powder means the values measured by the sieving method.

In the sintered metal friction material of the present invention, the content of the iron powder in the friction material composition is 20 to 40 mass %, preferably 23 to 37 mass %, more preferably 25 to 35 mass %.

In the sintered metal friction material of the present invention, when the content of the iron powder is within the above range, the strength of the friction material can be enhanced, and in addition, the other components can be contained in the material in a desired amount so that the material exhibits suitable fade resistance.

In the sintered metal friction material of the present invention, the nickel powder for a matrix metal can be one or more selected from those prepared by the atomizing (spraying) method and those prepared by the carbonyl nickel method.

When the nickel powder constituting the matrix metal is one or more selected form those prepared by the atomizing (spraying) method and those prepared by the carbonyl nickel method, the strength of the friction material can be easily enhanced, and in addition, the material is able to have excellent heat resistance even at high load and have a higher friction coefficient, while exhibiting suitable fade resistance.

In the sintered metal friction material of the present invention, the nickel powder preferably has the range of a particle size within 1 to 200 μm, more preferably 3 to 100 μm, and still more preferably 5 to 20 μm.

The above-mentioned range of a particle size of nickel powder means the values measured by the sieving method.

In the sintered metal friction material of the present invention, the content of the nickel powder in the friction material composition is 20 to 40 mass %, preferably 23 to 37 mass %, more preferably 25 to 35 mass %.

In the sintered metal friction material of the present invention, when the content of the nickel powder is within the above range, also the strength of the friction material can be enhanced, and in addition, the other components can be contained in the material in a desired amount so that the material exhibits suitable fade resistance.

In the sintered metal friction material of the present invention, the total content of the iron powder and the nickel powder in the friction material composition is preferably 40 to 80 mass %, more preferably 46 to 74 mass %, still more preferably 50 to 70 mass %.

In the sintered metal friction material of the present invention, when the total content of the iron powder and the nickel powder is within the above range, the enhancement effect of the strength of the friction material and fade resistance resulted by containing the other components in a desired amount can be exhibited more easily.

In the sintered metal friction material of the present invention, the zinc powder for the matrix metal is not particularly limited, but includes those prepared by the atomizing (spraying) method.

In the sintered metal friction material of the present invention, the zinc powder preferably has the range of a particle size within 5 to 200 μm, more preferably 10 to 100 μm, still more preferably 35 to 65 μm.

The above-mentioned range of a particle size of zinc powder means the values measured by the sieving method.

In the sintered metal friction material of the present invention, the content of the zinc powder in the friction material composition is 0.5 to 10 mass %, preferably 1 to 9 mass %, more preferably 5 to 7 mass %.

In the sintered metal friction material of the present invention, when the content of the zinc powder is within the above range, the strength of the friction material is enhanced and thus wear resistance can be enhanced, adhesion to a mating material during friction can be easily suppressed, and in addition, a desired friction coefficient can be easily provided.

In the sintered metal friction material of the present invention, the tin powder for the matrix metal is not also particularly limited.

In the sintered metal friction material of the present invention, the tin powder preferably has the range of a particle size within 5 to 200 µm, more preferably 10 to 100 µm, still more preferably 20 to 50 µm.

The above-mentioned range of a particle size of tin powder means the values measured by the sieving method.

In the sintered metal friction material of the present invention, the content of the tin powder in the friction material composition is 0.5 to 5 mass %, preferably 1 to 4 mass %, more preferably 1 to 3 mass %.

In the sintered metal friction material of the present invention, when the content of the tin powder is within the above range, the strength of the friction material is enhanced and thus wear resistance can be enhanced, adhesion to a mating material during friction can be easily suppressed, and in addition, a desired friction coefficient can be easily provided.

In the sintered metal friction material of the present invention, the copper powder for the matrix metal is not particularly limited, but includes electrolytic copper powder.

In the sintered metal friction material of the present invention, the copper powder has the range of a particle size within 5 to 200 µm, more preferably 10 to 100 µm, still more preferably 15 to 40 µm.

The above-mentioned range of a particle size of copper powder means the values measured by the sieving method.

In the sintered metal friction material of the present invention, the content of the copper powder in the friction material composition is 0.5 to 4 mass %, preferably 1 to 4 mass %, more preferably 3 to 4 mass %.

In the sintered metal friction material of the present invention, while the content of the copper powder is limited to within the above range, the material has excellent wear resistance, heat resistance at high load and has a higher friction coefficient, and in addition, can provide a suppressed decrease in a friction coefficient and wear resistance even if the material is used repeatedly.

In the sintered metal friction material of the present invention, when the content of the copper powder is within the above range, the material can strongly adhere to a copper-plated steel plate while reducing the influence on an environment sufficiently.

In the sintered metal friction material of the present invention, the sintering assist powder for the matrix metal is not particularly limited, but is preferably one or more selected from, for example, iron boride powder, iron phosphide powder, copper phosphide powder, phosphor bronze powder, yttrium oxide, magnesium oxide, aluminum oxide, hafnium oxide etc., more preferably one or more selected from iron boride powder, iron phosphide powder, copper phosphide powder and phosphor bronze powder.

In the sintered metal friction material of the present invention, the iron boride powder preferably has the range of a particle size within 5 to 200 µm, more preferably 10 to 100 µm, still more preferably 20 to 50 µm.

In the sintered metal friction material of the present invention, the iron phosphide powder preferably has the range of a particle size within 5 to 200 µm, more preferably 10 to 100 µm, still more preferably 10 to 30 µm.

In the sintered metal friction material of the present invention, the copper phosphide powder preferably has the range of a particle size within 5 to 200 µm, more preferably 10 to 100 µm, still more preferably 10 to 30 µm.

In the sintered metal friction material of the present invention, the phosphor bronze powder preferably has the range of a particle size within 5 to 200 µm, more preferably 10 to 100 µm, still more preferably 10 to 30 µm.

The above-mentioned range of a particle size of each sintering assist powder means the values measured by the sieving method.

In the sintered metal friction material of the present invention, the content of the sintering assist powder in the friction material composition is 0.5 to 5 mass %, preferably 0.5 to 4 mass %, more preferably 0.5 to 3 mass %.

In the sintered metal friction material of the present invention, when the content of the sintering assist powder in the friction material composition is within the above range, sinterability of the iron powder and the nickel powder is enhanced and thus the strength of the friction material can be enhanced, the torque waveform during friction may tend to be flattened (generation of squeaking may tend to be suppressed), adhesion to a mating material during friction may tend to be suppressed, and in addition, a desired friction coefficient may tend to be obtained.

In the sintered metal friction material of the present invention, the total content of the matrix metals in the friction material composition is preferably 42 to 95 mass %, more preferably 49.5 to 90 mass %, still more preferably 59 to 84 mass %.

In the sintered metal friction material of the present invention, when the total content of the matrix metals in the friction material composition is within the above range, the strength of a friction material can be enhanced, and in addition, the material can exhibit suitable fade resistance.

In the sintered metal friction material of the present invention, the friction modifier is not particularly limited, but includes one or more selected from lubricant materials and hard materials.

The above-mentioned lubricant material can be one or more selected from graphite powder, coke powder, calcium fluoride powder, barium fluoride powder, boron nitride powder and molybdenum disulfide powder.

The hard material can be one or more selected from alumina powder, mullite powder, zircon sand powder and silica powder.

The other friction modifier can be one or more selected from manganese powder, iron oxide powder, Fe—Mo alloy powder, Fe—Si alloy powder, Fe—W alloy powder, mica powder and zeolite powder.

In the sintered metal friction material of the present invention, the content of the friction modifier in the friction material composition is preferably 5 to 58 mass %, more preferably 10 to 50.5 mass %, still more preferably 16 to 41 mass %.

In the sintered metal friction material of the present invention, when the content of the friction modifier in the friction material composition is within the above range, the material has excellent wear resistance, heat resistance even at high load and has a higher friction coefficient, and in addition, can provide a suppressed decrease in a friction coefficient and wear resistance even if the material is used repeatedly.

In the sintered metal friction material of the present invention, the friction material composition may further contain, if desired, one or more selected from carbon fibers, silicon carbide fibers, boron fibers, silica-alumina fibers, glass fibers, aramid fibers, steel fibers as well as other inorganic fibers and metal fibers (except for copper fibers and copper alloy-based fibers) in addition to matrix metals and a friction modifier.

The sintered metal friction material of the present invention can be produced by using the friction material composition, appropriately forming the sintered metal friction material by the known conventional method followed by a sintering treatment.

For example, a friction material composition is prepared by mixing each component and subjected to pressure forming to obtain a formed product which is then subjected to pressure sintering, and thus the sintered metal friction material can be produced.

For the treatment conditions during the above forming and during the pressure sintering treatment, the known conventional condition can be selected.

The sintered metal friction material of the present invention can be suitably used as a clutch material and a brake material, specifically, a clutch facing material, a brake lining material, a brake pad material etc.

According to the present invention, a sintered metal friction material can be provided that comprises a sintered material of a friction material composition comprising matrix metals and a friction modifier wherein the matrix metals have a particular formulation ratio in which iron powder and nickel powder are contained as main components, and therefore that has excellent wear resistance, heat resistance even at high load and has a higher friction coefficient while maintaining a friction coefficient and wear resistance that are hard to decrease, and has a reduced content of copper of less than 5 mass %.

EXAMPLES

Next, the present invention will be further described by reference to Examples, although the present invention will not be in any way limited by these Examples.

Example 1

Iron powder(reduced iron powder from Hoganas (which had been heat treated in hydrogen gas at a temperature of 900° C.), range of a particle size within 40 to 150 μm), nickel powder(which had been obtained by the carbonyl nickel method, range of a particle size within 5 to 20 μm), zinc powder (stamped powder, range of a particle size within 35 to 65 μm), tin powder (stamped powder, range of a particle size within 20 to 50 μm) and copper powder(electrolytic copper powder, range of a particle size within 15 to 40 μm) as matrix metals were mixed with iron phosphide powder (range of a particle size within 10 to 30 μm) and iron boride powder(range of a particle size within 20 to 50 μm) as sintering assists, graphite powder and calcium fluoride powder as lubricant materials, mullite powder, zircon sand powder and silica powder as hard materials so that the mass ratio listed in Table 1 was obtained, to prepare a friction material composition.

The obtained friction material composition was pressure formed into the predetermined shape, then the obtained formed product was placed on a copper-plated steel plate, and sintered in a reducing atmosphere at a temperature of 850° C. to obtain the target sintered metal friction material.

Friction Test

Dynamo tests were conducted by a dry process using the obtained sintered metal friction material and using a stainless steel disk as a mating material.

The test condition was in accordance with JASO T204. After rubbing the friction material and the mating material together sufficiently, inertia was set to 12.5 kg·m$^2$, and friction material properties (a friction coefficient, wear amount (mm) and a torque curve) were measured with varying initial velocity and deceleration.

Figure 2:
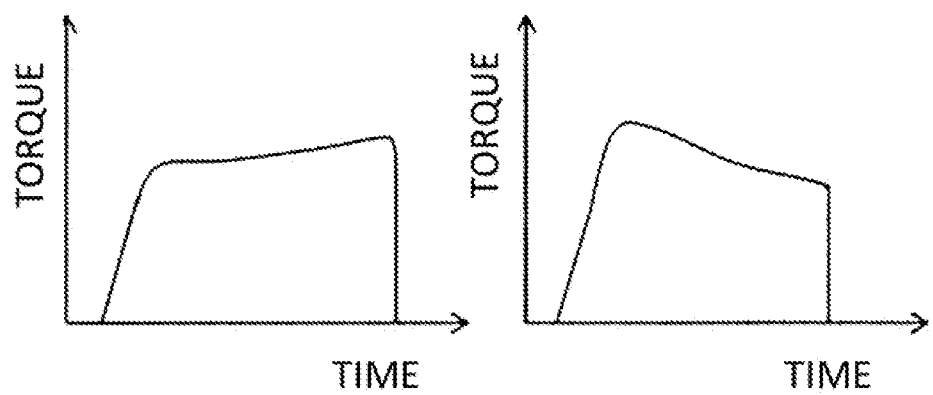
FIG. 2 illustrates a non-flat torque curve.

As shown in FIG. 1, if the torque curve as a function of time was horizontal (flattened) when braking was conducted at a constant liquid pressure, the torque curve was evaluated as "Good". As shown in left figure or right figure of FIG. 2, if the torque curve as a function of time was not horizontal but downward-sloping curve or upward-sloping curve (not flattened) when braking was conducted at a constant liquid pressure, the torque curve was evaluated as "Poor".

The results are shown in Table 2.

Shear Strength

The shear strength was measured in accordance with TIS D4422 using the obtained sintered metal friction material.

The results are shown in Table 2.

Examples 2-6

In Example 1, each sintered metal friction material was produced in the same way as Example 1, except that the formulation ratio (mass ratio) of each component was changed respectively as shown in Table 1. The friction test and the shear strength test were conducted in the same way as Example 1 using the each obtained sintered metal friction material. The results are shown in Table 2.

TABLE 1

| | | Example 1 | Example 2 | Example 3 | Example 4 | Example 5 | Example 6 |
|---|---|---|---|---|---|---|---|
| Matrix metal | Iron powder | 28.5 | 29.5 | 30.5 | 30.5 | 38.5 | 22.5 |
| | Nickel powder | 31.5 | 31.5 | 31.5 | 31.5 | 22.5 | 38.5 |
| | Zinc powder | 6.0 | 6.0 | 6.0 | 6.0 | 6.0 | 6.0 |
| | Tin powder | 2.0 | 2.0 | 2.0 | 2.0 | 2.0 | 2.0 |
| | Copper powder | 4.0 | 4.0 | 4.0 | 4.0 | 4.0 | 4.0 |
| | Iron phosphide powder | 3.0 | 2.0 | 1.0 | — | 2.0 | 2.0 |
| | Iron boride powder | — | — | — | 1.0 | — | — |
| Friction modifier | Graphite powder | 12.0 | 12.0 | 12.0 | 12.0 | 12.0 | 12.0 |
| | Calcium fluoride powder | 2.0 | 2.0 | 2.0 | 2.0 | 2.0 | 2.0 |
| | Mullite powder | 3.0 | 3.0 | 3.0 | 3.0 | 3.0 | 3.0 |
| | Zircon sand powder | 4.0 | 4.0 | 4.0 | 4.0 | 4.0 | 4.0 |
| | Silica powder | 4.0 | 4.0 | 4.0 | 4.0 | 4.0 | 4.0 |

(mass ratio)

TABLE 2

|  | Example 1 | Example 2 | Example 3 | Example 4 | Example 5 | Example 6 |
|---|---|---|---|---|---|---|
| Friction coefficient (—) | 0.60 | 0.61 | 0.59 | 0.59 | 0.59 | 0.59 |
| Abrasion loss (mm) | 0.55 | 0.51 | 0.41 | 0.39 | 0.61 | 0.60 |
| Torque curve | Good | Good | Good | Good | Good | Good |
| Shear strength (MPa) | 11.2 | 11.4 | 8.9 | 10.8 | 6.7 | 11.5 |

Comparative Examples 1-4

In Example 1, each sintered metal friction material was produced in the same way as Example 1, except that the formulation ratio (mass ratio) of each component was changed respectively as shown in Table 3. The friction test and the shear strength test were conducted in the same way as Example 1 using the each obtained sintered metal friction material. The results are shown in Table 4.

TABLE 3

|  |  | Comparative Example 1 | Comparative Example 2 | Comparative Example 3 | Comparative Example 4 |
|---|---|---|---|---|---|
| Matrix metal | Iron powder | 6.5 | 32.5 | 42.5 | 22.5 |
|  | Nickel powder | 16.5 | 32.5 | 22.5 | 42.5 |
|  | Zinc powder | 6.0 | 4.0 | 4.0 | 4.0 |
|  | Tin powder | 2.0 | 2.0 | 2.0 | 2.0 |
|  | Copper powder | 44.0 | 4.0 | 4.0 | 4.0 |
|  | Iron phosphide powder | — | — | — | — |
|  | Iron boride powder | — | — | — | — |
| Friction modifier | Graphite powder | 12.0 | 12.0 | 12.0 | 12.0 |
|  | Calcium fluoride powder | 2.0 | 2.0 | 2.0 | 2.0 |
|  | Mullite powder | 3.0 | 3.0 | 3.0 | 3.0 |
|  | Zircon sand powder | 4.0 | 4.0 | 4.0 | 4.0 |
|  | Silica powder | 4.0 | 4.0 | 4.0 | 4.0 |

(mass ratio)

TABLE 4

|  | Comparative Example 1 | Comparative Example 2 | Comparative Example 3 | Comparative Example 4 |
|---|---|---|---|---|
| Friction coefficient (—) | 0.57 | 0.60 | 0.60 | 0.60 |
| Abrasion loss (mm) | 0.49 | 0.36 | 0.55 | 0.65 |
| Torque curve | Good | Poor | Poor | Poor |
| Shear strength (MPa) | 9.1 | 5.2 | 4.5 | 13.6 |

As can be seen from Table 1 and Table 2, it is found that the sintered metal friction material obtained in Examples 1-6 is obtained by sintering the friction material composition having a particular formulation, and thus has a reduced content of copper powder of less than 5 mass %, and in addition, has excellent strength, as a friction material, has high-level performance such as wear resistance and a friction coefficient etc. even at high load, can maintain the friction coefficient and wear resistance appropriately due to exhibiting the flat torque curve, and can exhibit excellent properties when braking a high speed vehicle at high deceleration.

On the other hand, it is found that the sintered metal friction material obtained in Comparative Example 1 has a high content of copper powder of 44 mass %, and thus the object of the present invention cannot be achieved.

Further, it is found that the sintered metal friction material obtained in Comparative Example 2 does not have a sintering assist, and the sintered metal friction material obtained in Comparative Example 3 has a high content of iron powder, therefore both of them have low shear strength, and does not provide flat torque curves, and thus they cannot maintain a friction coefficient and wear resistance appropriately.

Further, it is found that the sintered metal friction material obtained in Comparative Example 4 has a high content of nickel powder, and thus does not provide a flat torque curve and cannot maintain a friction coefficient and wear resistance appropriately.

INDUSTRIAL APPLICABILITY

According to the present invention, a sintered metal friction material can be provided that comprises a sintered material of a friction material composition comprising matrix metals and a friction modifier wherein the matrix metals have a particular formulation ratio in which iron powder and nickel powder are contained as main components, and therefore that has excellent wear resistance, heat resistance even at high load and has a higher friction coefficient while maintaining a friction coefficient and wear resistance that are hard to decrease, and has a reduced content of copper of less than 5 mass %.

The invention claimed is:

1. A sintered metal friction material wherein the sintered metal friction material comprises a sintered material of a friction material composition,
    the friction material composition comprises matrix metals and a friction modifier,
    the matrix metals consist of
    20 to 40 mass % of iron powder,
    20 to 40 mass % of nickel powder,
    0.5 to 10 mass % of zinc powder,
    0.5 to 5 mass % of tin powder,
    0.5 to 4 mass % of copper powder and
    0.5 to 5 mass % of sintering assist powder,
    wherein the total content of the matrix metals in the friction material composition is 42 to 95 mass % and the content of the friction modifier in the friction material composition is 5 to 58 mass %.

2. The sintered metal friction material according to claim 1, wherein the total content of the iron powder and the nickel powder in the friction material composition is 40 to 80 mass %.

3. The sintered metal friction material according to claim 1, wherein the sintering assist powder is one or more selected from iron boride powder, iron phosphide powder, copper phosphide powder and phosphor bronze powder.

4. The sintered metal friction material according to claim 1, wherein
 the friction modifier comprises a lubricant material and a hard material,
 the lubricant material is one or more selected from graphite powder, coke powder, calcium fluoride powder, barium fluoride powder, boron nitride powder and molybdenum disulfide powder, and
 the hard material is one or more selected from alumina powder, mullite powder, zircon sand powder and silica powder.

* * * * *